United States Patent Office.

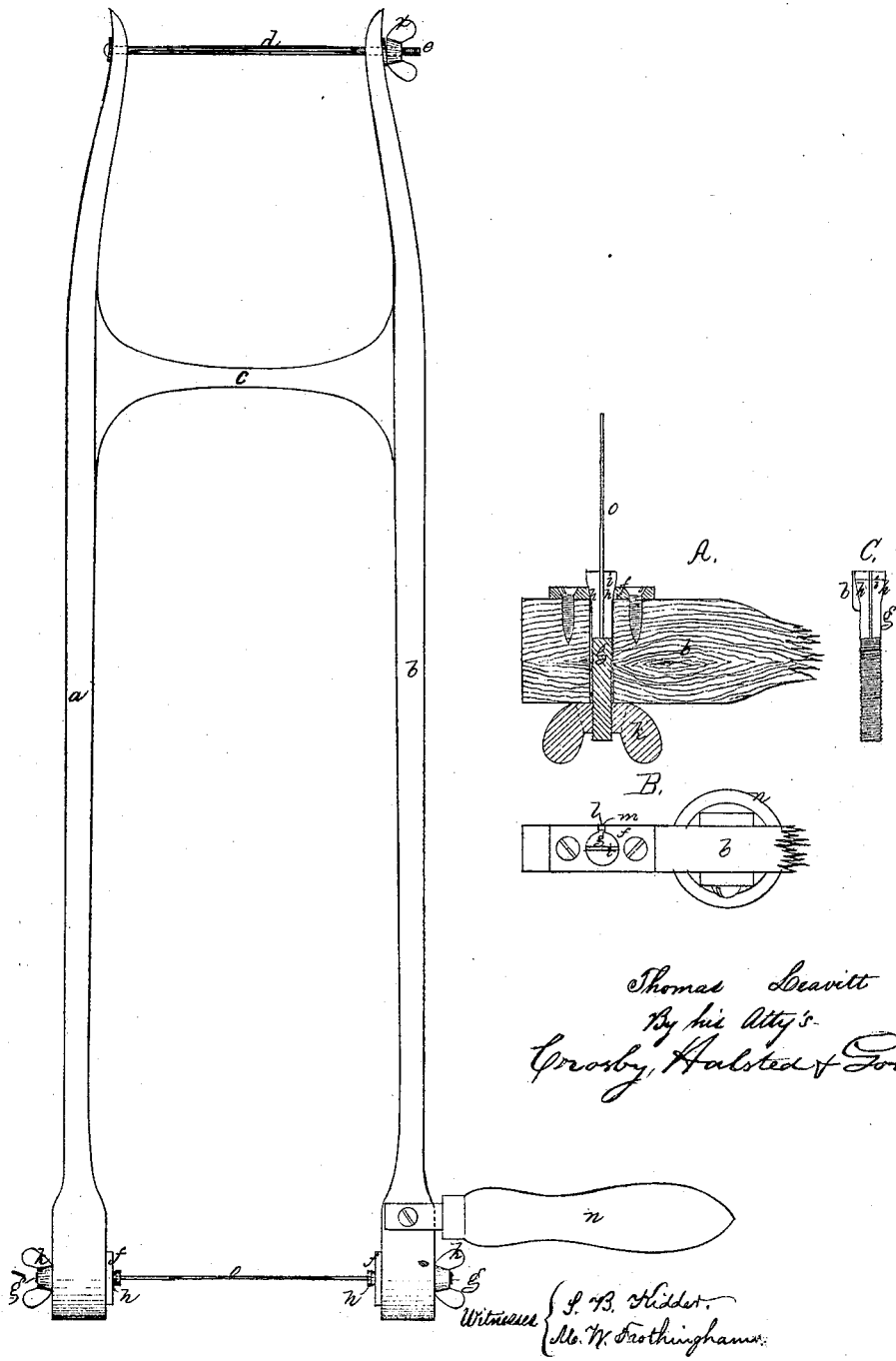

THOMAS LEAVITT, OF EVERETT, ASSIGNOR TO "SORRENTO WOOD-CARVINGS COMPANY," OF BOSTON, MASSACHUSETTS.

Letters Patent No. 110,051, dated December 13, 1870.

IMPROVEMENT IN BUHL-SAWS.

The Schedule referred to in these Letters Patent and making part of the same.

*To all whom it may concern:*

Be it known that I, THOMAS LEAVITT, of Everett, in the county of Middlesex, and State of Massachusetts, have invented an Improvement in Buhl-Saws; and I do hereby declare that the following, taken in connection with the drawing which accompanies and forms part of this specification, is a description of my invention sufficient to enable those skilled in the art to practice it.

My invention relates particularly to a method of clamping the ends of small fine saws, like hand-operated buhl-saws, in their frames.

The ends of these saws, and of most fine flat saws or jig-saws, are confined between clamp-plates, which are tightened upon the saw by a screw and nut, the screw extending from one plate through the other, which other is forced toward the first by the nut working over the screw-thread. For very fine saws these clamp-plates are objectionable, and do not clamp the saw sufficiently tight to prevent its slipping.

In my invention I employ for each end of the saw a clamp-pin having a diametric slit, and formed with a long conical taper between the head and shank, the incline or tapering portion of the head passing through and resting on a bearing-plate or seat fixed to the arm of the saw-frame, while the shank of the pin, which is screw-threaded, passes through said arm.

On the outer side of the frame a nut works upon the screw, and by tightening this nut the tapering head of the clamp-pin is drawn into the bearing-plate, the hole through which, being smaller than the outer end of the head, causes the two parts of the head to be forced tightly against the saw, clamping it securely in position.

The invention primarily consists in this method of clamping a saw, and in making each clamp-pin with a key or spline, which, entering a notch in the bearing-plate, prevents any rotative movement of the saw.

The drawing represents a saw-frame having a saw clamped in accordance with my invention, and the details, A, B, and C, show one of the clamp-pins and seat or bearing-plate in full size.

$a\ b$ denote the two bars of the saw-frame, connected by the strut or cross-bar $c$.

$d$ is the straining-rod, which, by means of a screw-thread, $e$, cut upon it, and a nut, $x$, draws the outer ends of the bars $a\ b$ inward, and forces the opposite ends of the bar outward, thereby stretching or straining the saw $o$ extended across between the two bars.

On the inner side of each bar $a\ b$, at the saw-holding ends thereof, a plate, $f$, is fastened, each plate $f$ having a conical hole made through it, through which two holes and holes bored through the bars $a\ b$, in line therewith, the clamp-pins $g$ are passed.

The head of each pin has a conical taper, as seen at $h$, the conical part resting in its plate $f$, and each head is slit diametrically, as seen at $i$, and to such distance into the pin as to permit the opposite parts of the head to be pressed together.

The screw-threaded shank of each pin passes through and projects beyond the frame-bar $a$ or $b$, and a nut, $k$, works upon said thread, the nut bearing against the bar or upon a suitable washer, and, by its rotation, drawing the head of the screw more or less into the plate $f$.

Into the slits of the two clamp-pins the opposite ends of the saw are thrust, (the clamp-pins being first loosened by the nuts,) and, by then turning up the nuts, the conical heads are forced into the plates, thereby pressing the two parts of each head tightly upon the saw, so that it cannot possibly slip from position at either end.

To prevent the saw from turning or twisting, each clamp-pin is made with a spline or key, $l$, that, entering a slot, $m$, in the plate $f$, fastens the key, so that while it can slide endwise it cannot move rotatively.

In all hand-worked buhl-saws, and similar saws heretofore made, the saw has been in axial line with the center of the handle, but in my saw I place the nut and clamp-pin (adjacent to the handle) in line with the saw, and fasten the handle $n$ to the bar of the saw-frame, on one side of the nut and pin, thus leaving the nut at all times accessible, to tighten or loosen the clamp-pin.

I claim—

In combination with the saw and saw-frame, the plates $f$ and the clamp-pins $g$, either with or without the splines, all substantially as shown and described.

Executed November 12, A. D. 1870.

THOMAS LEAVITT.

Witnesses:
    FRANCIS GOULD,
    J. F. BEALE.